United States Patent
Alexandrovichserov et al.

(10) Patent No.: US 7,858,264 B2
(45) Date of Patent: Dec. 28, 2010

(54) CATALYST FOR ANODE OF FUEL CELL AND MEMBRANE-ELECTRODE ASSEMBLY FOR FUEL CELL

(75) Inventors: Alexey Alexandrovichserov, Suwon-si (KR); Chan Kwak, Suwon-si (KR); Si-Hyun Lee, Suwon-si (KR)

(73) Assignee: Samsung SDI Co., Ltd., Gihoung-gu, Yongin-si, Gyeonggi-do (KR)

( * ) Notice: Subject to any disclaimer, the term of this patent is extended or adjusted under 35 U.S.C. 154(b) by 749 days.

(21) Appl. No.: 11/715,498

(22) Filed: Mar. 8, 2007

(65) Prior Publication Data

US 2007/0269705 A1    Nov. 22, 2007

(30) Foreign Application Priority Data

Mar. 9, 2006    (KR) .................. 10-2006-0022248

(51) Int. Cl.
    *H01M 4/02*    (2006.01)
(52) U.S. Cl. ..................................... 429/525
(58) Field of Classification Search ............ 429/40
    See application file for complete search history.

(56) References Cited

U.S. PATENT DOCUMENTS

| | | | |
|---|---|---|---|
| 2004/0121217 A1* | 6/2004 | Herman et al. | 429/38 |
| 2005/0014037 A1* | 1/2005 | Boyer et al. | 429/12 |
| 2005/0214610 A1* | 9/2005 | Yoshimura et al. | 429/30 |
| 2007/0160895 A1 | 7/2007 | He et al. | |
| 2007/0160897 A1* | 7/2007 | He et al. | 429/40 |
| 2007/0212590 A1 | 9/2007 | He et al. | |

FOREIGN PATENT DOCUMENTS

| | | |
|---|---|---|
| KR | 10-2002-0074451 | 9/2002 |
| KR | 10-2006-0039404 | 5/2006 |
| KR | 10-2006-0056451 | 5/2006 |
| WO | WO 0137359 | 5/2001 |
| WO | WO 2005/008813 | 1/2005 |

OTHER PUBLICATIONS

Lewis, Sr., Richard J. Hawley's Condensed Chemical Dictionary. 13th ed. New York, NY: John Wiley & Sons, Inc., 1997. p. 36.*
Korean Office action corresponding to Korean Patent Application No. 10-20060022248, issued on Feb. 27, 2007.

* cited by examiner

*Primary Examiner*—Dah-Wei D Yuan
*Assistant Examiner*—Stephan Essex
(74) *Attorney, Agent, or Firm*—Robert E. Bushnell, Esq.

(57) ABSTRACT

The anode catalyst for a fuel cell, the anode catalyst containing a Pd—Au—Sn alloy. The anode catalyst has an equivalent catalyst performance to that of platinum-based catalysts but costs significantly less.

17 Claims, 2 Drawing Sheets

CATALYST FOR ANODE OF FUEL CELL AND MEMBRANE-ELECTRODE ASSEMBLY FOR FUEL CELL

CLAIM OF PRIORITY

This application makes reference to, incorporates the same herein, and claims all benefits accruing under 35 U.S.C. §119 from an application for CATALYST FOR ANODE OF FUEL CELL AND MEMBRANE-ELECTRODE ASSEMBLY FOR FUEL CELL earlier filed in the Korean Intellectual Property Office on 9 Mar. 2006 and there duly assigned Serial No. 10-2006-0022248.

BACKGROUND OF THE INVENTION

1. Field of the Invention

The present invention relates to an anode catalyst for a fuel cell, and a membrane-electrode assembly including the same. More particularly, the present invention relates to an anode catalyst that can save cost of a fuel cell and that has improved efficiency, and a membrane-electrode assembly including the same.

2. Description of the Related Art

A fuel cell is a power generation system for producing electrical energy through an electrochemical redox reaction of an oxidant and a fuel such as hydrogen, or a hydrocarbon-based material such as methanol, ethanol, natural gas, and the like. The polymer electrolyte fuel cell is a clean energy source that is capable of replacing fossil fuels. It has advantages such as high power output density and energy conversion efficiency, operability at room temperature, and being small-sized and tightly sealed. Therefore, it can be applicable to a wide array of fields such as non-polluting automobiles, and electricity generation systems and portable power sources for mobile equipment, military equipment, and the like.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of having a high energy density while being able to output a high amount of power, but it also has problems because there is a need to carefully handle hydrogen gas and the requirement for accessory facilities such as a fuel reforming processor for reforming methane or methanol, natural gas, and the like in order to produce hydrogen as the fuel gas. On the contrary, a direct oxidation fuel cell has a lower energy density than that of the polymer electrolyte fuel cell, but has the advantages of easy handling of the liquid-type fuel, a low operation temperature, and no need for additional fuel reforming processors.

In the above-mentioned fuel cell system, a stack that generates electricity substantially includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to the anode and adsorbed on catalysts of the anode, and the fuel is oxidized to produce protons and electrons. The electrons are transferred into the cathode via an external circuit, and the protons are transferred into the cathode through the polymer electrolyte membrane. In addition, an oxidant is supplied to the cathode, and then the oxidant, protons, and electrons react on catalysts of the cathode to produce electricity along with water.

For an anode catalyst of a fuel cell, a platinum-based catalyst is generally used due to its high catalytic activity. However, the cost of this platinum-based catalyst is high and therefore research has been undertaken for another catalyst that can be substituted for the platinum-based catalyst. For example, Pd, which is relatively cheaper than platinum, can be used for an oxidation reaction catalyst of hydrogen fuels since it can be used either in the form of a supported or black type, like platinum. Therefore, Pd is considered for a substitute catalyst for platinum-based catalysts. However, catalytic activity of Pd is significantly lower than platinum and thus Pd is difficult to use as a substitute catalyst for platinum. What is needed is an improved catalyst that is both less expensive and performs well.

SUMMARY OF THE INVENTION

One aspect of the present invention is to provide an anode catalyst that can reduce the cost of a fuel cell while having improved efficiency.

Another aspect of the present invention is to provide a membrane-electrode assembly that includes the anode catalyst.

Another aspect of the present invention is to provide an anode catalyst for a fuel cell that includes a Pd—Au—Sn alloy.

Still another aspect of the present invention is to provide a membrane-electrode assembly that includes a cathode and an anode facing each other with an electrolyte interposed therebetween is provided. The anode includes an anode catalyst including a Pd—Au—Sn alloy.

According to one aspect of the present invention, there is provided an anode catalyst that includes a Pd—Au—Sn alloy. The catalyst can include 10 to 40 mol % of Pd. The catalyst can include 20 to 50 mol % of Au. The catalyst can include 10 to 70 mol % of Sn. The catalyst can have an average particle diameter ranging from 2 to 3 nm.

According to another aspect of the present invention, there is provided a membrane-electrode assembly that includes an anode and a cathode facing each other and a polymer electrolyte membrane arranged between the anode and the cathode, wherein the anode includes a catalyst that comprises a Pd—Au—Sn alloy. The catalyst can include 10 to 40 mol % of Pd. The catalyst can include 20 to 50 mol % of Au. The catalyst can include 10 to 70 mol % of Sn. The catalyst can have an average particle diameter ranging from 2 to 3 nm. The catalyst can be adapted for use in either a polymer electrolyte fuel cell or a mixed reactant fuel cell.

According to still yet another aspect of the present invention, there is provided a fuel cell system that includes an electricity generating element that includes a membrane-electrode assembly adapted to generate electricity through fuel oxidation and oxidant reduction, a fuel supplier adapted to supply a fuel to the electricity generating element and an oxidant supplier adapted to supply at least an oxidant to the electricity generating element, wherein the membrane-electrode assembly comprises an anode and a cathode facing each other and a polymer electrolyte membrane arranged between the anode and the cathode, the anode includes a Pd—Au—Sn alloy. The fuel cell system can be either a polymer electrolyte fuel cell system or a mixed reactant fuel cell system. The fuel cell system can be a polymer electrolyte fuel cell system and the oxidant supplier being adapted to supply only an oxidant to the electricity generating element. The fuel cell system can be a mixed reactant fuel system, and the oxidant supplier can be adapted to supply a mixture of a fuel and an oxidant to the electricity generating element.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
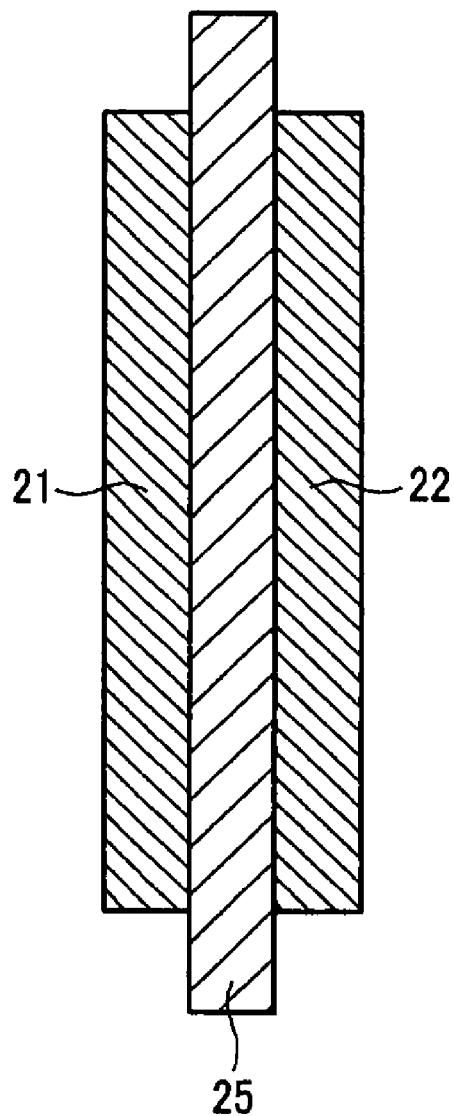
FIG. 1 is a schematic cross-sectional view showing a membrane-electrode assembly according to one embodiment of the present invention.

For an anode catalyst of a fuel cell, a platinum-based catalyst is generally used due to its high catalytic activity. However, the cost of this platinum-based catalyst is high and therefore research has been undertaken for another catalyst that can be substituted for the platinum-based catalyst. For example, Pd, which is relatively cheaper than platinum, can be used for an oxidation reaction catalyst of hydrogen fuels since it can be used either in the form of a supported or black type, like platinum. Therefore, Pd is considered to be a substitute catalyst for platinum-based catalysts. However, catalytic activity of Pd is significantly lower than platinum and thus Pd is difficult to use as a substitute catalyst for platinum.

According to one embodiment of the present invention, the anode catalyst has equivalent catalytic activity to that of platinum, while it includes Pd. The anode catalyst according to one embodiment of the present invention includes Pd, Au, and Sn. In particular, the anode catalyst is a Pd—$AuSn_3$ alloy. In the anode catalyst, Au prevents a CO oxidation reaction, that is to say, it prevents catalyst poisoning in which the anode catalyst reacts with CO and active sites of the catalyst. Sn stabilizes the catalyst and improves catalyst activity.

According to one embodiment, in the anode catalyst of the present invention, a Pd amount ranges from 10 to 40 mol %, a Au amount ranges from 20 to 50 mol %, and a Sn amount ranges from 10 to 70 mol %. When the Pd amount is more than 40 mol %, catalyst selectivity is low, whereas when it is less than 10 mol %, catalyst activity is also low. When the Au amount is less than 20 mol %, catalyst selectivity is low, whereas when it is more than 50 mol %, catalyst activity is also low. When the Sn amount is less than 10 mol %, catalyst activity is low, whereas when it is more than 70 mol %, the catalyst particle size increases.

The anode catalyst according to one embodiment of the present invention has an average particle diameter ranging from 2 to 3 nm, which is significantly smaller than that of a conventional platinum-based catalyst. The small average particle diameter increases active surface areas of the catalyst and thereby increases catalyst activity.

The anode catalyst may be used in a form of a catalytic metal itself (black catalyst), or can be used while being supported on a carrier. The carrier may include carbon, such as activated carbon, denka black, ketjen black, acetylene black, or graphite, or an inorganic particulate such as alumina, silica, zirconia, or titania.

The anode catalyst of the present invention can be prepared as follows. First, Au-containing and Sn-containing water-soluble salts are subject to dry impregnation in a carrier, and then a reducing agent is added. The dry impregnation process is performed as follows: the Au-containing and Sn-containing water-soluble salts are dissolved in a small amount of solvent and then the resulting solution is added to a carrier. Suitable solvents include water, alcohol such as ethanol or methanol, and benzene. The Au-containing and Sn-containing water-soluble salts can be mixed to a suitable mixing ratio in accordance with the composition of the resulting product.

The Au-containing water-soluble salt includes $H_2AuCl_4$, and the Sn-containing water-soluble salt includes $Sn(NO_3)_2 \cdot 2H_2O$. The reducing agent includes $NaBH_4$. The reducing agent can be in solution form where the reducing agent is dissolved in a solvent such as water, NaOH, and so on in a concentration of 0.1 to 2M. The Au-containing water-soluble salt, Sn-containing water-soluble salt, and reducing agent are not limited to the above specific compounds, and any compound can be used in order to obtain the anode catalyst.

Subsequently, the obtained mixture is dried. The drying process is performed at a temperature of 50 to 90° C. for 2 to 4 hours. A Pd water-soluble salt is added to the dried product followed by heat-treatment. The Pd water-soluble salt includes palladium acetylacetonate, ammonium hexachloropalladate, or a combination thereof. The heat treatment is performed at a temperature of 200 to 350° C. for 1 to 3 hours. When the heat treatment is performed at a temperature less than 200° C., a reduction reaction is not performed sufficiently. When it is performed at the temperature of more than 350° C., the catalyst particle size may increase.

In accordance with the above process, the anode catalyst including a Pd—Au—Sn alloy according to one embodiment of the present invention is obtained. The anode catalyst can be applicable to a mixed reactant fuel cell as well as a polymer electrolyte fuel cell. The mixed reactant fuel cell includes a catalyst at an anode catalyst layer, which optionally acts only for oxidation of a fuel, and another catalyst at a cathode catalyst layer, which optionally acts only for reduction of an oxidant. Therefore, even if the fuel and oxidant mixture is provided to the anode and cathode catalyst layers, only oxidation of the fuel occurs at the anode catalyst layer, while only reduction of the oxidant occurs at a cathode catalyst layer.

Hereinafter, common elements in a polymer electrolyte fuel cell and in a mixed reactant fuel cell are described together. Even though specific descriptions of a mixed fuel cell system are not set forth hereinafter, it is of course obvious that the mixed fuel cell system has a general constitution of a mixed reactant fuel cell, when the anode catalyst is applied to a mixed reactant fuel cell.

When the anode catalyst is applied to an anode of a polymer electrolyte fuel cell, the cathode includes a platinum-based catalyst. The platinum-based catalyst includes platinum, ruthenium, osmium, a platinum-ruthenium alloy, a platinum-osmium alloy, a platinum-palladium alloy, a platinum-M alloy, or combinations thereof, where M is a transition element such as Ga, Ti, V, Cr, Mn, Fe, Co, Ni, Cu, Zn, Sn, Mo, W, Rh, Ru and combinations thereof. Representative examples of the catalysts are Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst) or can be used while being supported on a carrier. The carrier may include carbon such as activated carbon, denka black, ketjen black, acetylene black, or graphite, or an inorganic particulate such as alumina, silica, zirconia, or titania. When the anode catalyst is applied to an anode of a mixed reactant fuel cell, a cathode includes, but is not limited thereto, Fe—N/C, Co—N/C, RuSe/C, RuS/C or combinations thereof that are dispersed on a generally-used carbon carrier.

The catalyst layers of the anode and cathode may further include a binder resin to improve adherence and proton transferability. The binder resin may be a proton conductive polymer resin having a cation exchange group such as a sulfonic acid group, a carboxylic acid group, a phosphoric acid group, a phosphonic acid group, and derivatives thereof, at its side chain. Non-limiting examples of the polymer include at least one proton conductive polymer such as fluoro-based polymers, benzimidazole-based polymers, polyimide-based polymers, polyetherimide-based polymers, polyphenylene-sulfide-based polymers polysulfone-based polymers, polyethersulfone-based polymers, polyetherketone-based polymers, polyether-etherketone-based polymers, and polyphenylquinoxaline-based polymers. In a preferred embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The binder resin may be used singularly or as a mixture. Optionally, the binder resin may be used along with a non-conductive polymer to improve adherence between a polymer electrolyte membrane and the catalyst layer. The amount used of the binder resin may be adjusted according to its usage purpose. Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

The cathode and anode catalysts are disposed on electrode substrates, respectively. The electrode substrate supports the electrode, and provides a path for transferring fuel and an oxidant to the catalyst. In the case of a mixed reactant fuel cell, the electrode substrate also acts as a separator. In one embodiment, the electrode substrates are made out of a material such as carbon paper, carbon cloth, carbon felt, or a metal cloth (a porous film composed of metal fiber or a metal film disposed on a surface of a cloth composed of polymer fibers). The electrode substrate is not limited thereto.

A microporous layer (MPL) can be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, ketjen black, activated carbon, carbon fiber, fullerene, nano-carbon, or combinations thereof. The nano-carbon may include a material such as carbon nanotubes, carbon nanofiber, carbon nanowire, carbon nanohoms, carbon nanorings, or combinations thereof.

The microporous layer is formed by coating a composition comprising a conductive powder, a binder resin, and a solvent on the conductive substrate. The binder resin may include, but is not limited to, polytetrafluoro ethylene, polyvinylidene fluoride, polyvinyl alcohol, cellulose acetate, polyhexafluoro propylene, polyperfluoroalkylvinyl ether, polyperfluoro sulfonylfluoride alkoxy vinyl ether, and copolymers thereof. The solvent may include, but is not limited to, an alcohol such as ethanol, isopropyl alcohol, n-propylalcohol, butanol, and so on, water, dimethyl acetamide, dimethyl sulfoxide, or N-methylpyrrolidone. The coating method may include, but is not limited to, screen printing, spray coating, doctor blade methods, gravure coating, dip coating, silk screening, painting, and so on, depending on the viscosity of the composition.

According to another embodiment of the present invention, a membrane-electrode assembly includes the anode and the cathode having a structure as above, and a polymer electrolyte membrane interposed between the cathode and anode. The membrane-electrode assembly 20 is schematically shown in FIG. 1. Referring to FIG. 1, reference numeral 21 denotes a cathode, reference numeral 22 denotes an anode, and reference numeral 25 denotes a polymer electrolyte membrane.

The polymer electrolyte membrane functions as an ion-exchange member to transfer protons generated in an anode catalyst layer to the cathode catalyst layer. The polymer electrolyte membrane of the membrane-electrode assembly may generally include a proton conductive polymer resin. The proton conductive polymer resin may be a polymer resin having a cation exchange group, such as a sulfonic acid group, a carboxylic acid group, a phosphoric acid group, a phosphonic acid group, and derivatives thereof, at its side chain. Non-limiting examples of the polymer resin include fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In a preferred embodiment, the proton conductive polymer is one of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The hydrogen (H) in the proton conductive group of the proton conductive polymer can be substituted with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Since such a substitution is known to this art, a detailed description thereof is omitted.

A fuel cell system including the membrane-electrode assembly of the present invention includes at least one electricity generating element, a fuel supplier, and an oxidant supplier. The electricity generating element includes a membrane-electrode assembly and a separator. The electricity generating element generates electricity through oxidation of a fuel and reduction of an oxidant. In a polymer electrolyte fuel cell system, the separator may be a bipolar plate, whereas in a mixed reactant fuel cell, the separator may be an electrode substrate.

The fuel supplier plays a role of supplying the electricity generating element with a fuel. The oxidant supplier plays a role of supplying the electricity generating element with an oxidant such as oxygen or air. In a mixed reactant fuel cell, the oxidant supplier provides a fuel supplier with an oxidant. In the fuel supplier, the fuel and oxidant are mixed and then the mixture is supplied to the electricity generating element. The fuel includes liquid or gaseous hydrogen, or a hydrocarbon-based fuel such as methanol, ethanol, propanol, butanol, or natural gas.

Figure 2:
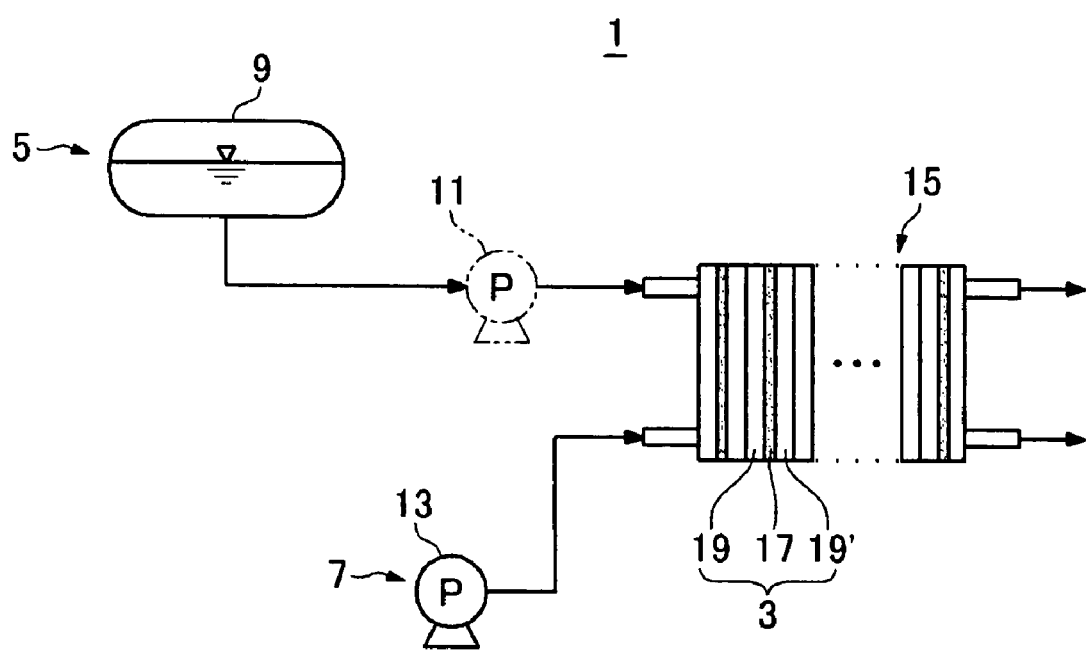
FIG. 2 schematically view of a structure of a fuel cell system according to one embodiment of the present invention.

FIG. 2 shows a schematic structure of a fuel cell system 1 that will be described in detail. FIG. 2 illustrates a fuel cell system 1 wherein a fuel and an oxidant are provided to the electricity generating element 3 through pumps 11, 13, but the present invention is not limited to such structures. The fuel cell system of the present invention alternatively includes a structure wherein a fuel and an oxidant are provided in a diffusion manner. The fuel cell system may also be a mixed reactant fuel cell system.

A fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3. In addition, the fuel supplier 5 is equipped with a tank 9 that stores fuel, and a pump 11 that is connected therewith. The fuel pump 11 supplies fuel stored in the tank 9 with a predetermined pumping power. The oxidant supplier 7, which supplies the electricity generating element 3 with an oxidant, is equipped with at least one pump 13 for supplying an oxidant with a predetermined pumping power.

The electricity generating element 3 includes a membrane-electrode assembly 17 that oxidizes hydrogen or a fuel and reduces an oxidant, separators 19 and 19' that are respectively positioned at opposite sides of the membrane-electrode assembly 17 and supply hydrogen or a fuel, and an oxidant. At least one electricity generating element 3 is composed in a stack 15.

The following examples illustrate the present invention in more detail. However, it is understood that the present invention is not limited by these examples.

Example 1

0.5 g of $H_2AuCl_4$ and 0.7 g of $Sn(NO_3)_2 \cdot 2H_2O$ were dissolved in 2 ml of ethanol and 1 g of carbon was added thereto to provide a mixture. Then, 0.5M of a $NaBH_4$ solution (solvent: a mixture of 30 volume % of NaOH and 70 volume % of water) was added to the mixture. A precipitation product was filtered and dried at 90° C. to provide a AuSn/C powder. 1.6 g of palladium acetyl acetonate was dissolved in 100 ml of benzene, and 1 g of the provided AuSn/C powder was added thereto. Subsequently, the solvent was volatilized and heated under a $H_2$ atmosphere at 250° C. for 3 hours to provide an anode catalyst for a fuel cell. The provided catalyst included 35 mol % of Pd, 47 mol % of Au, and 18 mol % of Sn, and the average particle size thereof was 2.4 nm.

Comparative Example 1

A commercially available PtRu/C anode catalyst in which 10 wt % thereof was supported was used.

With the anode catalysts fabricated from Example 1 and Comparative Example 1, a fuel cell system was fabricated by a generally known process. Measurements were taken to determine the current density at 0.7V, and the results are shown in Table 1.

TABLE 1

| | Current Density (mA/cm² (0.7 V)) |
|---|---|
| Example 1 | 4.52 |
| Comparative Example 1 | 3.75 |

As shown in Table 1, the anode catalyst according to Example 1 had a slightly improved current density compared with that of Comparative Example 1. From the results, it is confirmed that the catalyst of Example 1, which is less expensive than the platinum-based catalyst of Comparative Example 1, can replace the platinum-based catalyst. The anode catalyst according to the present invention has superior catalyst performance to that of a platinum-based catalyst and is less expensive than the platinum-based catalyst.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An anode catalyst, comprising a Pd—Au—Sn alloy, with the anode catalyst comprising 10 to 40 mol % of Pd.

2. The anode catalyst of claim 1, the catalyst comprising 20 to 50 mol % of Au.

3. The anode catalyst of claim 1, the catalyst comprising 10 to 70 mol % of Sn.

4. The anode catalyst of claim 1, the catalyst having an average particle diameter ranging from 2 to 3 nm.

5. A membrane-electrode assembly, comprising:
   an anode and a cathode facing each other; and
   a polymer electrolyte membrane arranged between the anode and the cathode,
   wherein the anode comprises a catalyst that comprises a Pd—Au—Sn alloy, and the catalyst comprises 10 to 40 mol % of Pd.

6. The membrane-electrode assembly of claim 5, wherein the catalyst comprises 20 to 50 mol % of Au.

7. The membrane-electrode assembly of claim 5, wherein the catalyst comprises 10 to 70 mol % of Sn.

8. The membrane-electrode assembly of claim 5, wherein the catalyst has an average particle diameter ranging from 2 to 3 nm.

9. The membrane-electrode assembly of claim 5, the catalyst is adapted for use in either a polymer electrolyte fuel cell or a mixed reactant fuel cell.

10. A fuel cell system, comprising:
    an electricity generating element that includes a membrane-electrode assembly adapted to generate electricity through fuel oxidation and oxidant reduction;
    a fuel supplier adapted to supply a fuel to the electricity generating element; and
    an oxidant supplier adapted to supply at least an oxidant to the electricity generating element, wherein the membrane-electrode assembly comprises an anode and a cathode facing each other and a polymer electrolyte membrane arranged between the anode and the cathode, the anode comprising a catalyst that comprises a Pd—Au—Sn alloy with the catalyst comprising 10 to 40 mol % of Pd.

11. The fuel cell system of claim 10, the fuel cell system being either a polymer electrolyte fuel cell system or a mixed reactant fuel cell system.

12. The fuel cell system of claim 10, wherein the fuel cell system being a polymer electrolyte fuel cell system and the oxidant supplier being adapted to supply only an oxidant to the electricity generating element.

13. The fuel cell system of claim 10, wherein the fuel cell system is a mixed reactant fuel system, and
the oxidant supplier is adapted to supply a mixture of a fuel and an oxidant to the electricity generating element.

14. The anode catalyst of claim 1, the anode catalyst being composed only of the Pd—Au—Sn alloy.

15. The membrane-electrode assembly of claim 5, wherein the catalyst being composed only of the Pd—Au—Sn alloy.

16. The anode catalyst of claim 1, the anode catalyst to oxidize a fuel supplied to the anode into protons and electrons.

17. The fuel cell of claim 10, the Pd—Au—Sn anode alloy to oxidize the supplied fuel into protons and electrons.

* * * * *